INVENTOR.
CARLYLE O. TELFORD
BY Schapp & Hatch
ATTORNEYS

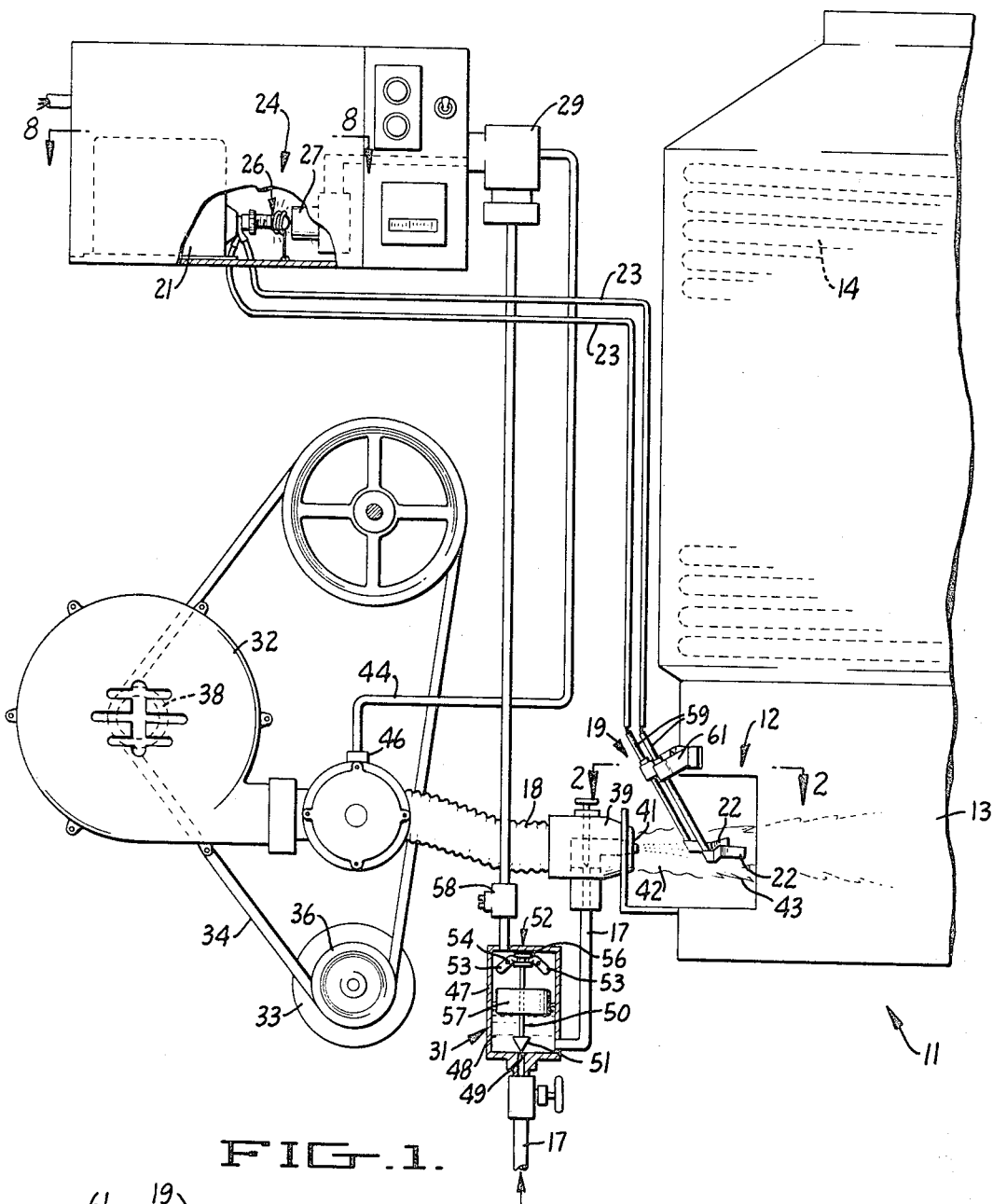
FIG._1.
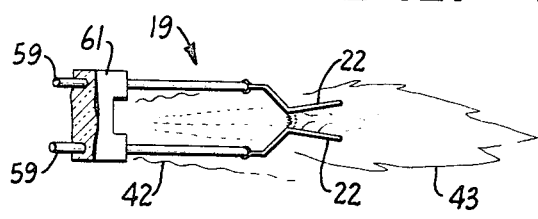
FIG._2.

Nov. 12, 1968  C. O. TELFORD  3,410,646
FUEL IGNITION SYSTEM

Filed June 16, 1966  5 Sheets-Sheet 3

INVENTOR.
CARLYLE O. TELFORD
BY
Schapp & Hatch
ATTORNEYS

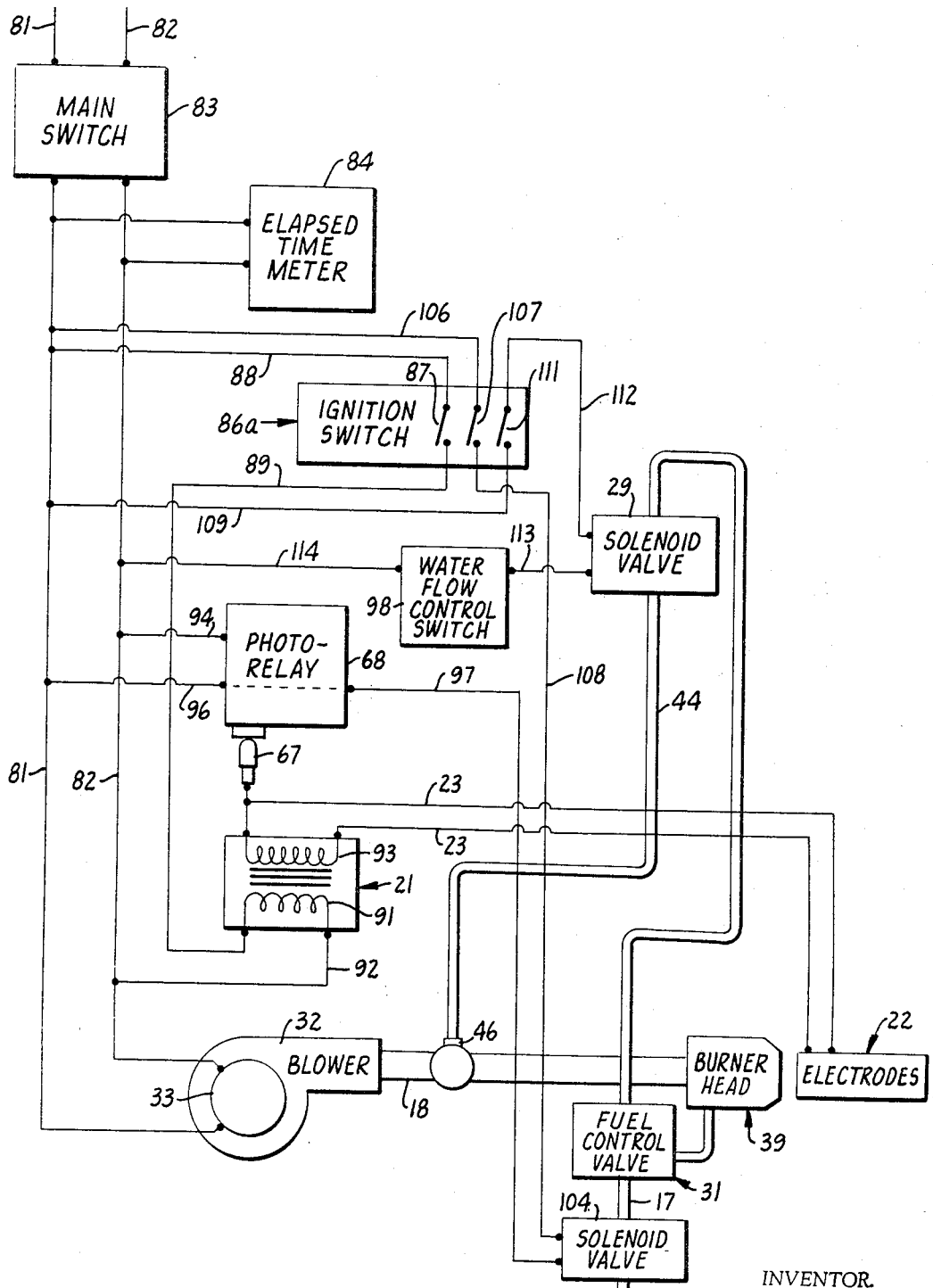

understand United States Patent Office
3,410,646
Patented Nov. 12, 1968

3,410,646
FUEL IGNITION SYSTEM
Carlyle O. Telford, Hayward, Calif., assignor to Malsbary Manufacturing Company, Oakland, Calif., a corporation of California
Filed June 16, 1966, Ser. No. 558,135
19 Claims. (Cl. 431—66)

ABSTRACT OF THE DISCLOSURE

A fuel ignition system utilizing a spark igniter and spark detector for shutting off fuel except when operating under safe conditions and specifically adapted to provide automatic shut-off of fuel in the absence of either the spark or a forced draft of air; the system comprising a discriminating spark detector constructed with a neon glow light in sufficient proximity to the spark or high voltage circuit therefore to be excited when a spark is present and provide a significant difference in light intensity as between the blown spark and unblown spark, together with means for detecting the difference in light intensity and utilizing same to control the fuel feed to the burner.

---

Figure 3:
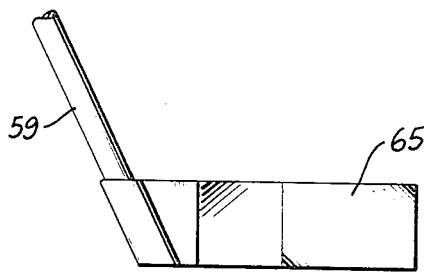

The present invention relates to improvements in a fuel ignition system, and more particularly to a fuel ignition system including a spark together with automatic control means responsive to the presence of the spark for controlling fuel flow.

It is well known to provide safety devices which are intended to cut off the flow of fuel to the burner in the event of failure of the ignition system. Most of these safety systems are responsive to the detection of flame or heat or other characteristics present during combustion and are operative to shut down the unit completely in the event of failure even though temporary. In many cases, fuel burners require both the presence of a fuel and an air blast for vaporizing the fuel and carrying it into the firebox, and the known systems do not provide satisfactory assurance that fuel does not flow during malfunction of either the ignition or the blast of air.

This problem is particularly acute where the fuel burner must be operated in intermittent fashion with many "on" periods of short duration. Such operating conditions are typical of burners for steam cleaners or the like where the use of steam and required steam generation is responsive to the intermittent demands of the operator.

The present invention was developed to solve this problem, particularly in connection with the use of burners for such steam generators, but it will be appreciated that the invention is applicable to any type of fuel burner utilizing a spark ignition system to ignite a rapidly moving stream of mixed fuel and air.

It has been found in practice that where fuel is "on," but the blast of compressed air or other combustion supporting gas is insufficient, the fuel tends to enter the firebox without igniting and provides a dangerous explosive hazard. The raw fuel does not ignite because of insufficient vaporization and mixing action. It should also be appreciated that a typical explosive hazard is created where malfunction of the ignition means occurs, and unignited air-fuel mixture is blown from the burner.

Accordingly, it is the primary object of the present invention to provide a fuel ignition system which wll automatically shut off fuel flow in case of malfunction of either the ignition system or the forced air supply, preventing accumulations of unburned fuel and consequent safety hazards.

Another object of the invention is to provide a burner equipped with a spark ignition system having a novel spark detector device capable of determining the presence of desired ignition conditions and preventing improper operaton of the burner.

A further object of the invention is to provide a fuel ignition system of the character described having a spark detector which is capable of discriminating between the type of spark occurring when insufficient air is being supplied and the type of spark occurring during sufficient air supply, so that the burner can be made operable only when desired ignition conditions are present.

Still another object of the invention is to provide a burner equipped with a fuel ignition system of the character described having novel means for automatically shutting off fuel supply from the burner when any improper ignition condition arises in order to assure safe operation of the device.

Further objects and advantages of the invention will be apparent as the specification progresses and the new and useful features of the fuel ignition system will be fully defined in the claims attached hereto.

Figure 4:
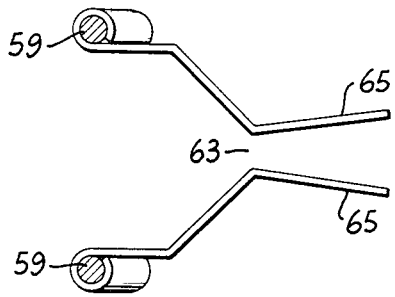
Figure 5:
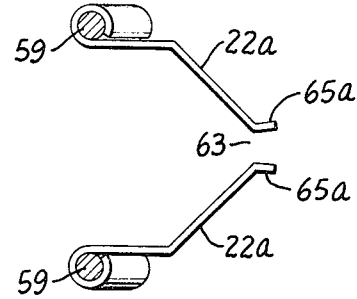
Figure 6:
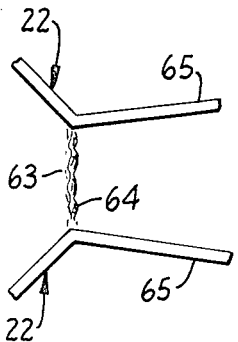
Figure 7:
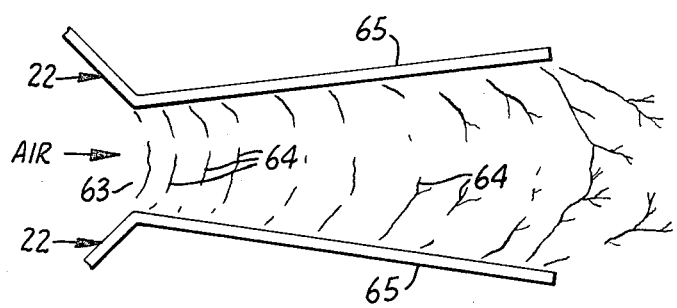
Figure 8:
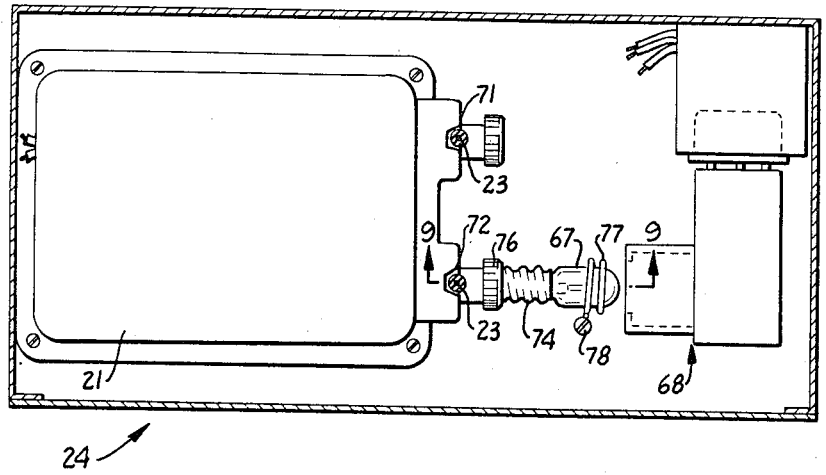
Figure 9:
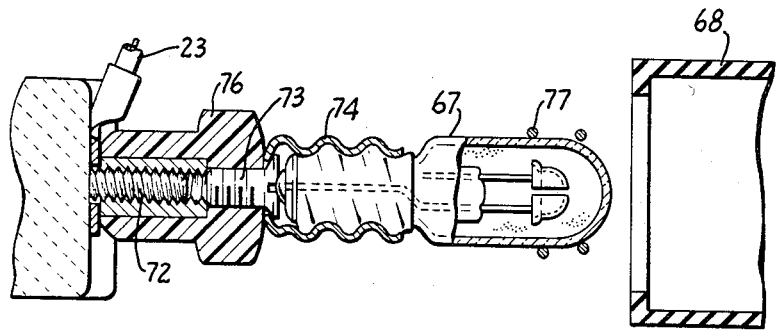
Figure 10:
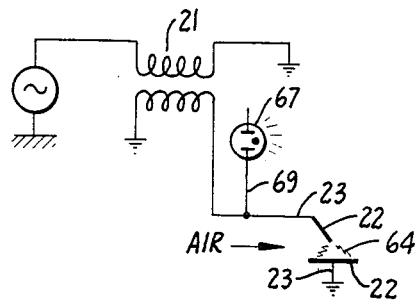
Figure 11:
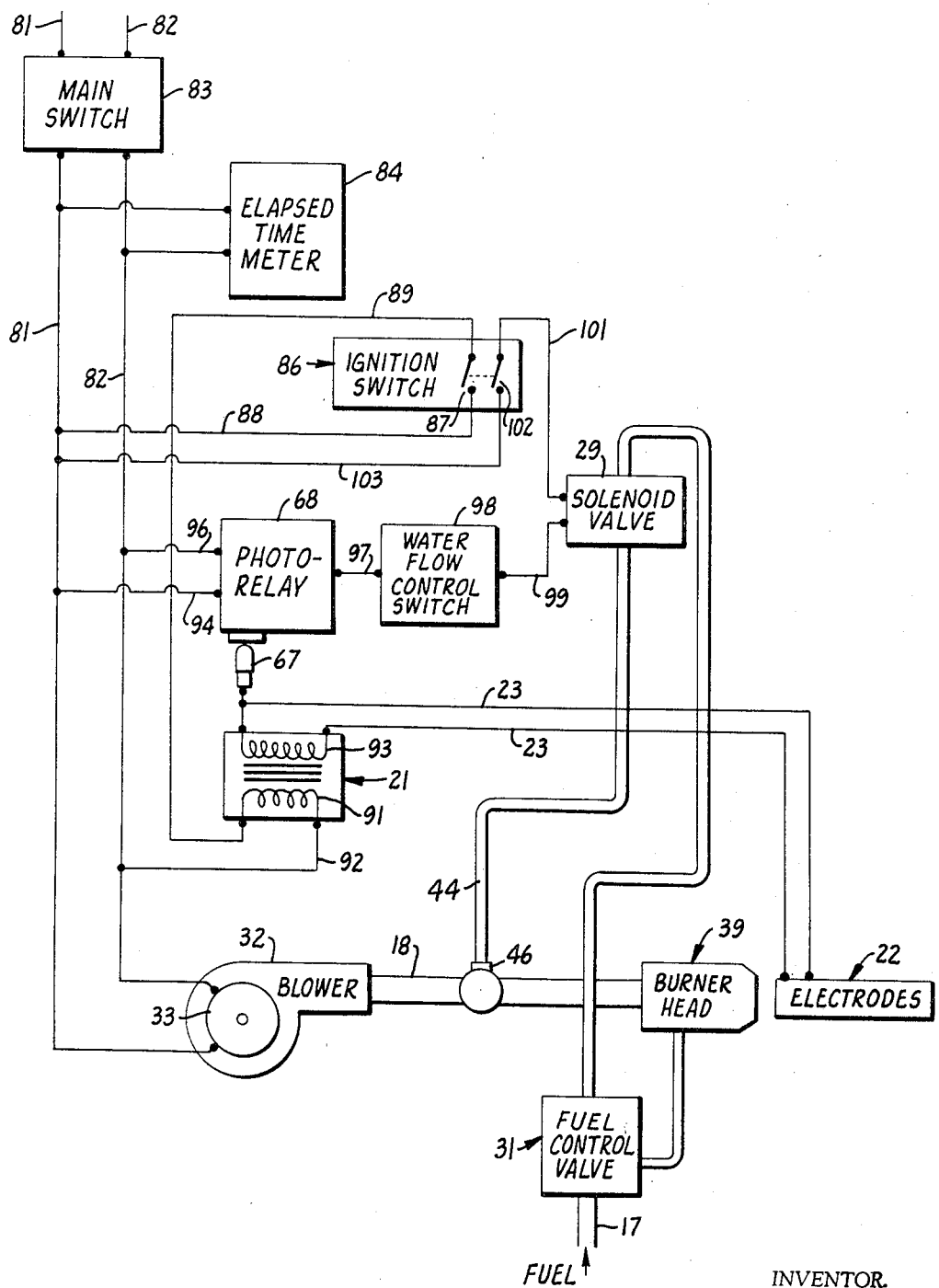

The preferred forms of the invention are illustrated in the accompanying drawings forming part of the specification, in which:

FIGURE 1 is a diagrammatic view illustrating a typical apparatus utilizing the fuel ignton system of the present invention;

FIGURE 2, a plan view on an enlarged scale taken substantially on the plane of line 2—2 of FIGURE 1;

FIGURE 3, an enlarged side elevational view of a pair of electrodes shown in FIGURE 2;

FIGURE 4, a plan view of the electrodes shown in FIGURE 3;

FIGURE 5, a plan view of an alternate form of a pair of electrodes similar to those shown in FIGURE 4, but illustrating a variation of construction thereof;

FIGURE 6, a fragmentary view on an enlarged scale of the electrodes shown in FIGURE 4, illustrating the position of the spark paths when no air is flowing past the spark gap through the burner;

FIGURE 7, a view similar to FIGURE 6, illustrating the characteristics and positioning of the spark during the flow of a blast of air of fuel-air mixture through the spark gap;

FIGURE 8, a plan view of a portion of the apparatus shown in FIGURE 1, taken substantially on the plane of line 8—8 thereof;

FIGURE 9, an enlarged cross-sectional view of a fragmentary portion of the apparatus shown in FIGURE 8, taken substantially on the plane of line 9—9 thereof;

FIGURE 10, a circuit diagram illustrating a typical basic circuit for the spark detector utilized in this invention;

FIGURE 11, a block diagram illustrating the circuit utilized in the apparatus illustrated in FIGURES 1 through 9 of the drawngs; and FIGURE 12, a block diagram illustrating an alternate form of the invention in which two separate valves are utilized in the fuel line together with suitable controls therefor.

While only the preferred forms of the invention are shown, it should be understood that various changes or modifications may be made within the scope of the claims attached hereto without departing from the spirit of the invention.

Referring to the drawings in greater detail and more particularly to FIGURE 1, there is shown a steam generator 11 equipped with the fuel ignition system of the present invention, and comprising a burner 12 located in a firebox 13 in suitable position for heating the steam generating coils 14. The burner 12 receives fuel from fuel line 17, a blast of air through air line 18, and is equipped with spark means 19 for providing an ignition spark in the blast of fuel-air mixture coming from the burner. This spark means 19 is relatively conventional in character and, as here shown, includes a high voltage transformer 21, a pair of electrodes 22, and suitable lead wires 23 to complete the high voltage spark circuit.

In accordance with the invention, a fuel ignition spark detector means 24 is provided which is preferably located at some distance from the spark forming between electrodes 22, but in operative position to detect the presence of the desired spark within the burner. This spark detector comprises a light means or light source 26, operative to emit variable amounts of light and controlled by the characteristics of an electric spark, and a light sensing means 27 responsive to the light emission level of the light source 26 for producing a control signal.

The light sensing means 27 is formed to provide an electric control signal and is operatively connected to means 29 for shutting off fuel flow to the burner 12, here a valve in fuel line 17, such as a constant level fuel control valve 31. If desired, the means 29 could be made to operate any suitable shutoff valve located in fuel line 17, instead of the preferred fuel control valve 31 illustrated in FIGURE 1 of the drawings.

The rapidly moving stream of air to burner 12 may be provided by any suitable means, such as a blower 32 driven by an electric motor 33 through a belt 34, see FIGURE 1 of the drawings.

The burner 12 is equipped with a burner head 39 adapted to receive fuel from line 17 and mix it with the blast of air being furnished by blower 32 through line 18 to provide a combustible fuel-air mixture. The burner head 39 may be of any suitable type, such as air atomizing or pressure atomizing, for instance, so long as it is capable of directing the desired blast of fuel-air mixture 42 into the firebox 13. This blast of fuel-air mixture 42 passes through and around the electrodes 22, where sparking occurs to ignite the mixture and produce a flame 43.

As a feature of the present invention, the flow of fuel to the burner head 39 is immediately cut off if the desired type and character of sparking is not taking place between the electrodes 22. The constant level fuel control valve 31 is constructed to shut off the flow of fuel from valve 31 to the burner 12 whenever either the blower 32 is not operating properly or the desired type of sparking is not present between electrodes 22. This action of valve 31 is controlled by air pressure coming from blower 32 in such manner that the flow of fuel from valve 31 to the burner head 39 will be prevented whenever the controlling air pressure drops.

As here shown, a branch line 44 is connected to air line 18 by means of a fitting 46 and is constructed to provide air at a desired pressure in the line 44 when the blower 32 is operating properly. The branch line 44 is connected to the constant level fuel control valve 31, as may best be seen in FIGURE 1 of the drawings. The means 29, responsive to the control signal provided by light sensing means 27, here consists of a solenoid-operated shutoff valve interposed in the branch line 44. Thus, unless sparking of the desired characteristics is taking place between electrodes 22, the light emission level from means 26 will be too low to provide a control signal from light sensing means 27 sufficient to cause the solenoid-operated valve 29 to open. With valve 29 closed, the constant level fuel control valve 31 will continue to prevent flow of fuel to the burner 12.

As here shown, the constant level control valve 31 comprises a housing 47 defining a chamber 48, a valve seat 49 in the bottom of the chamber at the entry point of fuel line 17, a vertically reciprocatable valve stem 50 having a valve member 51 adapted for engaging seat 49, means 52 adapted for lifting valve stem 50 to open the valve and including a pair of weighted arms 53 each pivoted at 54 and engaging a collar 56 so that the weighted arms normally lift the valve stem upward, and a float 57 within chamber 48 for effecting closure of the valve when the float rises and lifts the outer ends of arms 53.

The operation of the constant level fuel control valve 31 is as follows: In FIGURE 1, the valve member 51 is lifted from seat 49 and fuel oil is flowing from a source such as a fuel pump (not shown) through the valve 31 to burner head 39. In this position, oil tends to rise in the valve chamber 48 and the air pressure supplied by line 44 to the upper part of chamber 48 tends to lower the level of oil within the chamber. So long as the air pressure and oil pressure balance, valve member 51 will remain lifted from its seat and oil will be supplied to burner head 39. If the blower slows down or the solenoid valve 29 operates to shut off the pressurized air, oil will no longer flow to burner head 39 because the lack of pressurized air will allow the chamber to fill in preference, the burner head being elevated higher than the fuel oil level in chamber 48. In order to prevent the residual compressed air from continuing the flow of oil to burner head 39 from chamber 48, a bleeder 58 is provided in branch line 44 between the solenoid valve 29 and the constant level fuel control valve 31.

Thus, on shut off of the air line by solenoid 29, fuel oil continues to flow into the chamber 48 of constant level fuel control valve 31 from the fuel pump until the chamber is filled sufficiently to lift float 57 against the extremities of arms 53 and force the valve stem 50 downwardly to its seated position, shutting off the fuel supply from the fuel pump but leaving the chamber 48 filled with fuel oil to be supplied to burner head 39 immediately upon air under pressure entering chamber 48 from line 44. In this way, the constant level fuel control valve 31 gives substantially instant response to opening or closing of solenoid valve 29 in branch air line 44.

In the embodiment here shown, the fuel for the burner is a liquid such as oil, and the spark detector 24 is operative through a special flow control valve 31 which is also operative in response to the supply of compressed air to the burner. However, it should be understood that this specific form has been developed for steam generators and that the invention is not to be limited in any way to steam generators nor to oil burners nor to the particular set-up described, the flow control valve 31 not being essential to the invention in its broad form. In other words, the spark detector can be made operative to control a separate valve in the fuel line 17, as will be explained more fully hereinafter. The fuel could be gas or any other flowable liquid or even solids carried by fluidizing techniques, and the blast of air could be any gas or the like capable of supporting combustion of the fuel used.

There are certain necessary conditions of combustion, however, which are present with the spark detector of this invention and it will be understood that burners and other equipment will be such to supply these conditions. For example, the burner must be of the type where the ignition is to take place by an electric spark and the fuel-air mixture should be presented in a rapidly moving stream into the burner. Thus, the burner flame should be ignited by the spark and the burner should not be "on" except when the spark is present. By the same token, the supply to the burner should be a moving steam of combustible mixture and the burner should not be "on" unless a sufficiently moving stream of mixture is provided.

In accordance with the invention, the spark detector is designed to detect the presence of a spark in a moving stream of air or the like before supplying fuel to the combustion area. When either the stream of moving air or the spark is insufficient or absent, the spark detector is designed to be provided in combination with an automatic shutoff for shutting off the supply of fuel. In this way, absolutely safe conditions are assured in a mechanism which is capable of intermittent operation.

In general, the electrodes 22 may be of any suitable configuration that will assure sparking across the moving stream of air-fuel mixture of an intensity sufficient to assure ignition of the mixture. However, it is also necessary to utilize electrodes formed and positioned in the rapidly moving stream of air or combustible mixture in such manner that the spark paths will be blown and elongated by the stream, the spark detector means 24 being responsive to the desired length of spark path to let fuel flow to the burner 12.

A preferred form of a pair of electrodes is shown in FIGURES 1 through 4 of the drawings, with the sparking characteristics thereof being shown in FIGURES 6 and 7. As there shown, the electrodes 22 are supported by a pair of conducting rods 59 held securely by an insulating block 61 in proper orientation within the firebox 13 in front of the burner head 39. If desired, either the position of the insulating block 61 or the electrodes can be made adjustable for adjusting the spacing and positioning of the electrodes.

As shown in FIGURE 4, the electrodes 22 are formed from flat strips bent at an angle to come together rapidly from their supports and form a gap 63, sections 65 extending therefrom away from the burner head 39 in diverging relation to the burner axis. In this way, a spark path 64 (see FIGURES 6 and 7) tends to be formed initially across the gap 63 and then blown away from the gap 63 along the divergent sections.

As illustrated in FIGURE 7, it is observed that a plurality of spark paths 64 tend to form and brush discharges also tend to emanate from the electrodes, as is characteristic of high voltage conductors. This multiplicity of spark paths and the presence of a large number of brush discharges is a direct consequence of the flowing stream of air or air-fuel mixture, as is the elongation of the blown spark paths, and the difference between the characteristics of the sparking depicted in FIGURES 6 and 7 is sufficient to influence the light source 26 in the set-up here shown so as to provide a considerably higher level of light intensity when the air or air-fuel stream is blowing between the electrodes 22 at the desired velocity than when the stream is diminished or non-existent.

In this way, the light sensing means 27 is able to detect the difference between the sparking shown in FIGURE 7 and the sparking shown in FIGURE 6, so that the spark condition shown in FIGURE 7, resulting from proper air supply, can be positively assured during the period of time that fuel is supplied to the burner.

Although the form of electrodes shown in FIGURES 1 through 4, 6 and 7 is preferred for some installations, it will be appreciated that the electrodes can be modified in shape to meet other requirements so long as the spark characteristics will be affected by the stream of air or air-fuel mixture in the manner described. Such a modified form is shown in FIGURE 5, wherein the divergent sections 65a of a pair of electrodes 22a are much shorter than in FIGURE 4. While the spark formation tends to differ somewhat from that illustrated in FIGURE 7, the blowing of the spark paths varies the sparking characteristics sufficiently for the spark detector means to discriminate between desired and undesired sparking and signal accordingly. Thus, if desired, the divergent sections could be eliminated and the electrodes could even be of rod-like form.

A typical form of spark detector means 24 is illustrated in FIGURES 8 through 10 of the drawings, where the spark detector means is shown in one form used in connection with the steam generator 11. The spark detector comprises light means 67 (light source) operative to emit light at different intensities in response to the characteristics of the spark at the fuel ignition position, and light sensing means 68 responsive to the intensity of said light means or source for producing a control signal.

The light sensing means 68 preferably includes a conventional photoelectric cell unit adapted to operate a relay when a certain level of light intensity is achieved, this relay then being utilized to control a shut-off device for preventing fuel flow to the burner. In the apparatus shown, the relay operated by light sensing means 68 controls operation of solenoid valve 29 in branch line 44. Closing of solenoid valve 29 causes operation of the valve 31 to prevent flow of fuel to the burner, in the manner explained above. Alternatively, a separate valve could be placed in fuel line 17 and the light sensing means 68 could have its relay operative to control this valve. In either case, the relay is set so that fuel is supplied to the burner only when the light intensity of light source 67 reaches a desired value indicating proper ignition conditions, and the fuel is prevented from reaching the burner when the light source 67 is either "off," indicating no spark, or of insufficient intensity, indicating an improper spark, or possibly a short circuit.

The light means may be any light source capable of emitting light in response to and in accordance with the intensity of an electric spark, a particularly suitable light source being a neon bulb such as the neon bulb sold by General Electric Company under the classification NE 45, 110–125 volts. This neon bulb should be placed either in close proximity to the spark or in close proximity to a conductor of the high voltage circuit providing the spark.

As shown in the circuit diagram of FIGURE 10, a typical location for light source 67 is given in which one of its conducters 69 is attached to a lead wire 23 in the circuit providing the spark 64. It has been found in practice that the bulb will emit light when the spark is provided at the spark gap even when the bulb is not actually touching or in electrical contact with one of the high voltage spark current conductors, but the intensity of the light is greater when one or both bulb leads are in electrical contact with a conductor in the high voltage circuit.

Excellent results are achieved when the light source 67 is the neon bulb mentioned above and is assembled in the set-up illustrated in FIGURES 8 and 9. In FIGURE 8, there is shown the high voltage transformer 21 with secondary terminals 71 and 72 for connecting high voltage lead wires 23. Terminal 72 is equipped with a special connector which not only holds lead wire 23 in place, but also provides a support for light means 67. This connector includes a conductive screw 73 having its shank in electrical contact with a secondary terminal and its head holding female socket 74 securely in place. Bulb 67 is then screwed into the socket so that its leads are both in electrical contact with the screw 73 in the manner shown. The spacing and tight condition of the socket is maintained by plastic fitting 76 so that the light bulb is securely positioned by anchoring to the housing of transformer 21.

It has been found in practice that the intensity of light source 67 may be further enhanced by the provision of an inductive shield 77, which is here provided in the form of a loop or coil surrounding the neon bulb 67 and grounded at 78. This inductive shield is optional but preferred because it increases the intensity of the light emitted from source 67.

When the transformer 21 is turned on to induce high voltage in the secondary thereof and no blast of air is provided through spark gap 63, a spark is obtained as shown in FIGURE 6 and some light is emitted from the light source 67. However, the amount of light emitted is insufficient to cause the photocell to operate the relay included in the light sensing means 68 and energize solenoid valve 29. When the spark is blown as indicated in FIGURE 7, the light intensity from source 67 is considerably increased so that the light sensing means 68 becomes operative to energize the solenoid and open the valve. With this arrangement, it will be appreciated that the air will first blow the spark before fuel is supplied but that almost instantaneous response is achieved so that any slight lagging time is inconsequential. On the other hand, positive assurance is provided that the air is blowing and the spark is present before fuel is supplied to the burner.

A typical circuit designed for use with the steam generator 11 illustrated herein is shown in FIGURE 11 of the drawings. This figure also includes certain of the operative elements described above in order to illustrate how the various elements are electrically connected and to illustrate the operation of the invention. FIGURE 12 is another circuit diagram similar to FIGURE 11, but showing an alternative arrangement of parts within the ambit of this invention.

Referring to FIGURE 11 in greater detail, a pair of main supply lines 81 and 82 are connected to a suitable source of electrical current and are provided with a main switch 83 and any desired conventional protective devices (not shown). When the main switch 82 is turned on, elapsed time meter 84 and motor 33 which operates blower 32 are energized. However, no current is provided to high voltage transformer 21 until switch 86 is closed.

Switch 86 is a double pole switch, with pole 87 providing electric current to the primary of the transformer through a circuit including lead 88 connected to supply line 81, switch 87, lead 89, primary 91 and lead 92, which is connected to supply line 82.

When transformer 21 is energized, high voltage is induced in secondary coil 93, which is connected to leads 23 to provide ignition sparking at electrodes 22. The blower is on at all times the transformer is on, since both are controlled through the main switch, and the resulting blast of air causes the spark to be blown and assume the configuration shown in FIGURE 7. Accordingly, light source 67 should glow at a high level intensity and activate the light sensing means 68.

The light sensing means 68 preferably includes a conventional photorelay, such as the photorelay provided by Sigma Instruments, Inc. under No. 8RCO1A which has proven quite suitable. The photorelay is connected to power supply lines 81 and 82 through leads 94 and 96 and has an output lead 97 adapted to be connected to lead line 96 when the relay is energized. Thus, when the photorelay is energized, power is supplied through a circuit provided by lead 96, the photorelay output lead 97, a water flow control switch 98, lead 99 to solenoid valve 29, lead 101 to the other pole 102 of switch 86, and lead 103 connected to main supply line 81. Thus, the operation of solenoid 29 is dependent upon the condition of both photorelay 68 and water flow control switch 98.

Water flow control switch 98 is a sensing device normally provided in the steam generator 11 equipped with the present invention. The function of switch 98 is to shut off the burner when no water is flowing through the steam generating coils 14. This is important in steam generators because the heating of these coils without sufficient water supply can provide a dangerous condition. Therefore, it is desired that the fuel flow to the burner head also be shut off when there is an inadequate water supply to the steam generating coils, as well as when the ignition characteristics are improper or the air supply insufficient. Since the photorelay and the water flow control switch are in series, both devices must indicate proper operating conditions before solenoid valve 29 operates in open branch line 44, causing fuel control valve 31 to supply fuel to the burner 12.

While the arrangement of parts illustrated in FIGURE 11 shows the addition of a photorelay (of light sending means 68) to a control circuit already provided for controlling fuel flow, it will be appreciated that the photorelay could operate a separate solenoid valve on fuel line 17, and such arrangements illustrated in FIGURE 12. As will also be appreciated, the circuit shown in FIGURE 12 is more applicable to burners in general, since the photorelay provides a separate independent safety control. This circuit has the advantage of providing additional safety, but has the disadvantage of requiring an additional solenoid valve in line 17. Accordingly, it should be considered as a satisfactory alternative to the circuit shown in FIGURE 11, with the preference depending upon requirements and circumstances.

Referring to FIGURE 12 in greater detail, the circuit shown therein is quite similar to that shown in FIGURE 11 and contains similar main supply lines 81 and 82 controlled by main switch 83 and supplying current directly to an elapsed time meter 84 and motor 33 of blower 32. Thus, when main switch 83 is on, the elapsed time meter and the blower are in operation and energy is provided to ignition switch 86a. The latter differs from ignition switch 86 in that switch 86a is a three pole instead of the two pole switch 86 of FIGURE 11.

One of the three poles of switch 86a, pole 87, is operative to energize primary 91 of transformer 21 and provide an ignition sparking at electrodes 22, as mentioned in the description for FIGURE 11. When this happens, the light source 67 should glow brightly because the spark should be blown and in condition to provide the necessary intensity. However, it will be appreciated that if air is not properly supplied to the electrodes or no spark is formed thereacross light 67 will be too dim or will not glow at all. Photorelay 68 is similar to photorelay 68 of FIGURE 11, and is operative when energized to connect its output lead 97 to power supply line 82. However, the circuit containing photorelay 68 is different in that output lead 97 supplies current to a solenoid valve 104, connected to line 81 through lead 106, switch 107, and lead 108, but solenoid valve 104 is separate and distinct from solenoid valve 29 and is interposed in the fuel supply line.

Solenoid valve 104 may be any suitable solenoid-operated fuel valve which is constructed to permit fuel to flow when energized and to halt fuel flow when not energized. The solenoid valve may be upstream of valve 31, as shown, or in the line 17 from valve 31 to burner head 39. In this way, fuel cannot escape from the burner into the firebox unless the photorelay 68 is actuated by light source 67, and light source 67 is not of sufficient intensity to actuate the photorelay unless the proper ignition conditions are present.

Fuel is also prevented from reaching the burner by the water flow control switch which operates solenoid valve 29 through the circuit going from supply line 81 through lead 109, switch 111, lead 112, solenoid valve 29, lead 113, water flow control switch 98, and lead 114. Thus, it is seen that the fuel control valve 31 is also controlled by water flow control switch 98 and no fuel will flow to the burner head unless both of the required conditions are present.

From the foregoing, it may be seen that the present invention provides a novel spark detector in which the flow of fuel to the burner is absolutely dependent upon the presence of the proper ignition characteristics. It is also apparent that the fuel ignition spark detector of this invention may be applied to any burner which is to be ignited by a spark and operate with a blower forcing a draft of gaseous combustion mixture through the spark position.

I claim:
1. In a fuel ignition system containing electrodes located in ignition position within a burner, a high voltage supply source for providing a spark between the electrodes, a fuel supply line, an air supply line for providing air under pressure, connection between the fuel line and air line to provide an air-fuel mixture, and a nozzle for directing the stream containing the air-fuel mixture through said ignition position, in combination, a fuel ignition spark detector for determining the presence of desired ignition conditions, comprising means for providing light at a separate and distinct location from the spark, said means being formed to provide a higher level of intensity of light when the ignition spark is influenced by the stream of gases than when the spark discharges in a relatively quiet atmosphere, and light sensing means responsive to said higher level of intensity of light from said light source to provide a control signal suitable for effecting control of fuel flow to the burner.

2. The fuel ignition system defined in claim 1, in which there is also provided an electrically controlled valve for shutting off fuel during the absence of the desired ignition conditions, and an electric circuit for providing operative control between the light sensing means and the electrically controlled valve.

3. The fuel ignition system defined in claim 2, in which the means for providing light is a neon glow light.

4. The fuel ignition system defined in claim 2, in which the sensing means is a light-actuated relay.

5. The fuel ignition system defined in claim 2, in which the spark is generated between a pair of electrodes positioned in the stream of air-fuel gases whereby the spark paths between said electrodes will be elongated by the stream during operation.

6. The fuel ignition system defined in claim 2, in which the means for providing light is a neon glow light located in close proximity to a conductor of the spark circuit, and in which an inductive shield is located around said glow light.

7. In an automatic burner operative to burn a moving stream of air-fuel mixture and having a fuel supply line, a blower, a fuel ignition system including a pair of spark producing electrodes located within the airstream from the blower, a high voltage supply source and spark circuit for providing a spark at the electrodes, and valve means within the fuel supply line adapted to shut off the supply of fuel during the absence of the desired ignition conditions, in combination, a fuel ignition spark detector for determining the presence of desired ignition conditions and controlling said valve means, comprising means for providing light from a fixed source formed to emit light when a spark is provided between the electrodes, the level of light intensity emitted from said light source being comparatively low during the presence of a spark at the electrodes in a quiet atmosphere and at a relatively high level when the spark is blown by air currents provided by the blower, light sensing means responsive to said light source for providing two different signal levels in response to said lower and said higher emission of light from the light source, and circuit means for controlling the valve on the fuel line whereby said valve means is shut off except when said light is emitted at said high level indicating the presence of the desired air currents at the electrodes.

8. The burner defined in claim 7, in which the means for providing light from a fixed source in the fuel ignition spark detector is a neon glow light placed in close proximity to one of the conductors in the high voltage spark circuit.

9. The burner system defined in claim 7, in which the electrodes are formed to provide a relatively close spaced area to form a primary spark gap and contain members disposed to diverge toward the downstream end of the stream of fuel and air.

10. The burner system defined in claim 7, in which said valve means includes two valves placed in the fuel line with one of said valves being adapted to open in response to control signals indicating preselected conditions for the burner to be turned on, and the other of said valves being formed to open in response to said light sensing means when proper ignition conditions are present in the burner.

11. The burner system defined in claim 7, in which the valve means is controlled by an electric solenoid wired in series with a photorelay serving as the light sensing means and a switch operated by an automatic control for controlling the "on" periods of the burner according to the existence of desired operating conditions.

12. A fuel ignition spark detector for determining the presence of desired ignition conditions in a burner, comprising light means operative to emit variable amounts of light and energized by the radio frequency energy controlled by the characteristics of an electric spark at a fuel ignition position with the light intensity being controlled by the characteristics of the spark, said light means being formed to provide a fixed source of light having a higher level of light intensity when the ignition spark is blown by a moving stream of gases, light sensing means responsive to the light emission level of said light means for producing a control signal, an electrically controlled valve for shutting off fuel during the absence of the desired ignition, and an electrical circuit responsive to said control signal for providing operative control between the light sensing means and the electrically controlled valve.

13. In a fuel ignition spark system having a sparking gap arrangement subject to changing ignition conditions and excited by a high voltage generator having an output circuit connected to said gap, the combination of a sparking detector for determining the presence of desired ignition conditions in the gap, comprising light means responsive to the output circuit remote from the gap to emit varying levels of light intensity in accordance with operation of the generator; and light sensing means responsive to the light emission level of said light means for producing control signal conditions indicative of varying ignition characteristics at the sparking means.

14. A safety fuel ignition spark detector system comprising sparking gap means subject to changing ignition conditions, high voltage generator means having leads connected to said gap means for producing sparking in the gap means, light means responsive to the high voltage in at least one of said leads and remote from the gap means to emit varying levels of light intensity in accordance with operation of the generator; and light sensing means responsive to the light emission level of said light means for producing control signal conditions indicative of varying ignition characteristics at the sparking means.

15. The safety fuel ignition spark detector system of claim 14 further comprising means for directing an air stream through the sparking gap means to influence the ignition conditions therein.

16. The safety fuel ignition spark detector system of claim 15 wherein the light means responsive to the high voltage generator means comprises neon glow tube means.

17. The safety fuel ignition spark detector system of claim 16 wherein the light sensing means comprises photorelay means.

18. In a fuel ignition spark system having a sparking gap arrangement subject to changing ignition conditions, as by high pressure air blowing therethrough, which sparking gap arrangement is excited by a high voltage generator, the combination of sparking detector means for determining the presence of desired ignition conditions in the gap, comprising light emitter means remote from the sparking gap arrangement and directly responsive to the high voltage generator to emit varying levels of light intensity in accordance with the operation of the generator; and light sensing means responsive to the light emission level of said light emitting means to produce a first type of control signal condition when the light sensed thereby is above a predetermined level and a second type of control signal condition when the light sensed is equal to or below the predetermined level.

19. The fuel spark system of claim 18, further comprising valve means for supplying fuel oil to the system for spark ignition, said valve means being operated to an open condition in response to the first control signal condition and to a closed condition in response to the second control signal condition.

References Cited

UNITED STATES PATENTS

| | | | |
|---|---|---|---|
| 1,924,304 | 8/1933 | Briesky et al. | 158—28 |
| 2,162,501 | 6/1939 | Draper | 158—28 |
| 2,655,209 | 10/1953 | Newton | 158—28 |
| 2,771,942 | 11/1956 | Miller | 158—28 |
| 2,812,800 | 11/1957 | Morrison | 158—124 |

JAMES W. WESTHAVER, *Primary Examiner.*